INVENTOR.
RICHARD E. TACKABERY

July 1, 1969

R. E. TACKABERY 3,453,644

THREE-FUNCTION PORTABLE RECORDER

Filed July 10, 1967

INVENTOR.
RICHARD E. TACKABERY
BY Carl R. Brown
Attorney

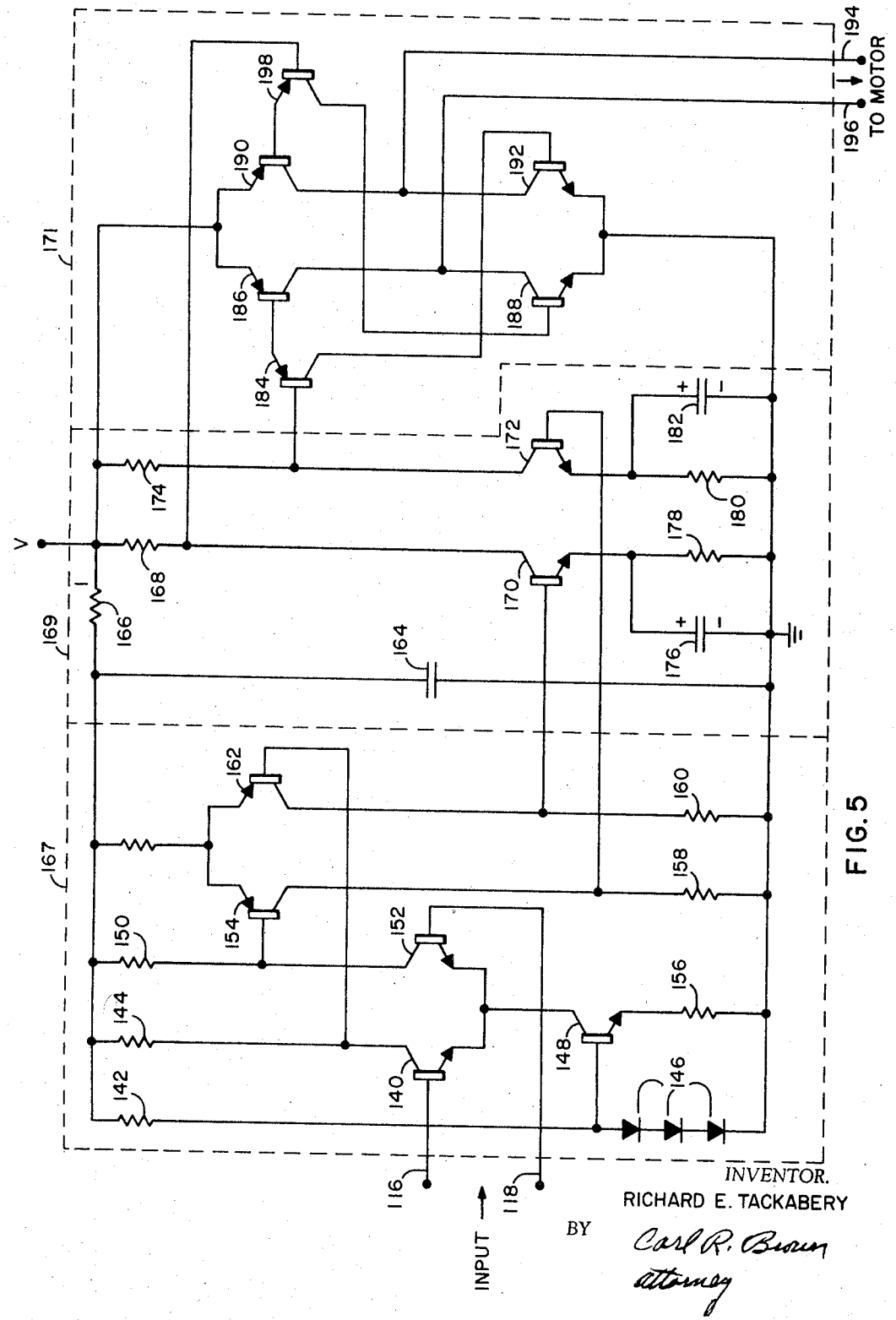

United States Patent Office 3,453,644
Patented July 1, 1969

3,453,644
THREE-FUNCTION PORTABLE RECORDER
Richard E. Tackabery, 1803 Goldfield St.,
San Diego, Calif. 92110
Filed July 10, 1967, Ser. No. 652,185
Int. Cl. G01d 9/02
U.S. Cl. 346—32                    3 Claims

ABSTRACT OF THE DISCLOSURE

This portable, graphic plotter and recorder plots independent variables against a dependant variable on pressure sensitive chart paper and is battery powered, is cylinderically shaped, and can be easily installed in simple environmental protection chambers for use in remote locations to plot three function information.

BACKGROUND OF THE INVENTION

The need for recording devices to record information or the like at remote locations has become an important requirement, especially in oceanography and space exploration. In the past, most recorders have been located at a land based points and the information at a remote locations is sensed and returned to the land based recorders. The problems of connecting wiring and communication between the sensing units and the recorders have made it evident that it would be advantageous to record the information at the point the information is sensed. However, such recorders must have a very compact size, be extremely reliable, must operate on battery power, and be able to plot a plurality of functions.

SUMMARY OF THE INVENTION

The portable, graphic plotter and recorder of this invention is specifically designed for recording three-function data in remote locations such as at depths in the ocean, at high altitudes and at remote land locations. It is battery powered and cylindrical in shape and can be easily installed in simple environmental protection chambers. Its function is to plot two independent variables against a dependant variable on chart paper. However it can be used to graph any input variables that can be converted to proportional voltages. The recorder uses several mechanisms for positioning a cylinderical drum and stylus pens and has follow-up elements that are excited with the same voltages in a servo mechanism. This allows a simple and extremely accurate measurement to be made and recorded directly.

In operation, the recorder is connected to an external sensing device that produces the input voltages to be recorded. Chart paper is wrapped around a drum and secured thereto. The drum is inserted into a cylinderical frame that has styli radially displaced from the outer circumference of the drum and that moves longitudinally to record the input voltages. The drum and styli are precisely moved and positioned by electromechanical servo mechanisms that respond to external input signal voltages to trace lines that graph the input signals. The graph may be visually observed while recording and a battery pack provides all the power necessary for operation of the recorder and for operating a unique amplified circuit that is used in the invention.

It is therefore an object of the invention to provide a new and improved portable graphic plotter and recorder.

It is another object of this invention to provide a new and improved portable three-function graphic plotter for recording data in remote locations.

It is another object of this invention to provide a new and improved amplifier circuit for use with a portable graphic plotter.

It is another object of this invention to provide a new and improved power amplifier circuit.

It is another object of this invention to provide a new and improved portable three-function graphic plotter having servo mechanisms for controlling the position of the styli in response to input signals to be graphed.

Other objects and many advantages of my invention will become more apparent upon a reading of the following detailed specification and in viewing the drawing in which like reference numerals designate like parts throughout and in which:

FIGURE 5 is a schematic diagram of an embodiment of the amplifier used in this invention.

Figure 1:
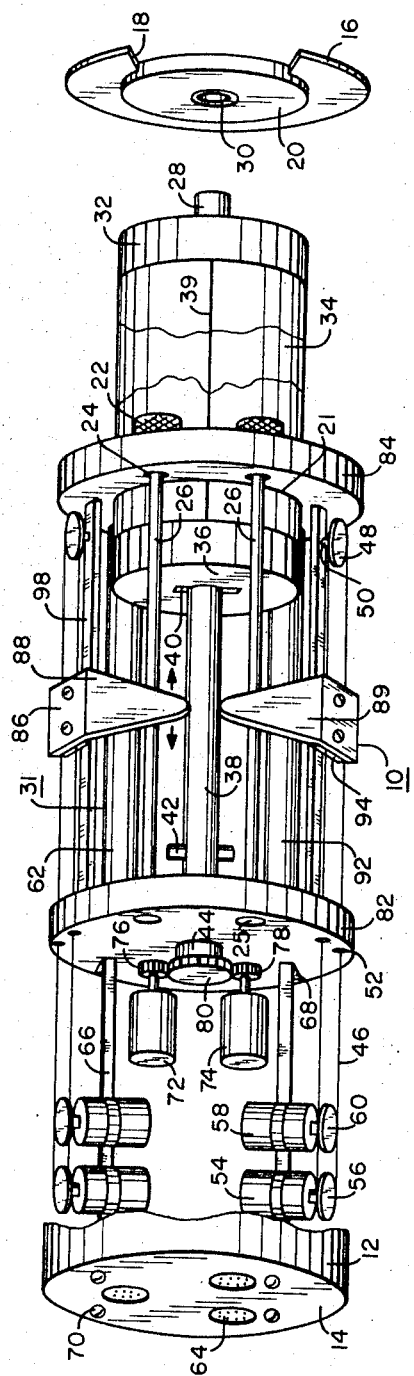
FIGURE 1 is a side, perspective view, partly in section and with parts broken away of an embodiment of the portable three-function graphic plotter and recorder of this invention.

Referring now to FIGURE 1, a portable, three-function, graphic plotter and recorder 10 comprises an open cylinderical frame 31 having circular bulkheads 82 and 84 that are secured in opposed relationship by stylus trolley rods 98 and a battery housing 62. The sides of this cylindrical frame 31 are open so that operation of the plotter and recorder may be observed. Secured to one side of the bulkhead 82 is a drive mechanism cover 12 having an end bulkhead 14. The cover 12 is removable and covers the motors, potentiometers, and other control circuitry. The amplifiers used in the electrical control systems of the graphic plotter are housed in container 92 that also functions to hold the bulkheads 82 and 84 together.

Figure 2:
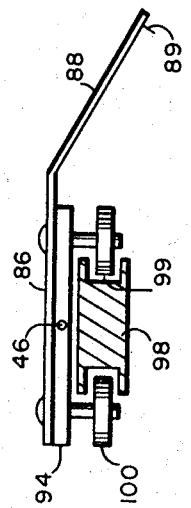
FIGURE 2 is a cross sectional view of the stylus and the stylus trolley rods.

A hollow recording drum 32, that may have a supply of paper therein that feeds out through a longitudinal opening in the outer cylindrical surface of the drum 32 in the manner well known in the art, has a circumferential length of paper held to the outer surface of the drum. The drum is mounted on a rod 38. The end of the rod 38 projects through bulkhead 82, through a bearing connection 44 and is driven through a fixed gear member 80. The bulkhead 84 has a cylindrical opening 21 therethrough for passing the drum 32. Slots 40 in the end 36 of the drum 32 coact with projections 42 so that when the drum is fully mounted, the turning force applied to gear 80 turns rod 38 in bearing 44 and also turns the drum 32. A plate 16 is secured to the outer surface of cylindrical bulkhead 84 and is fastened thereto by fasteners or the like (not shown). A recess 18 in the outer edge of plate 16 provides a recess for the ends 22 of the stylus lift members 26. Plate 16 has a bearing recess 30 therethrough that receives the end of shaft 28 projecting from the end of the drum 32. When assembled plate 16 is pressed against the outer surface of the cylindrical bulkhead 84 with the circular raised surface 20 fitting into the opening 21 with a relatively tight fit. The bearing 30 allows the drum 32 to rotate in a friction-reduced, aligned manner when turned by shaft 38. A pair of styli 88 and 89 (see FIGURES 1 and 2) are each supported on a stylus trolley 98. Each styli has a base member 94 that is secured to pairs of wheels 100 that rotatably move in channels 99 in rod 98. The base member 94 has a needle holding member 86 secured to the upper surface thereof with an integral flex spring member 88 that is flexibly biased into forcing the marking needle 89 to contact the paper 34 on the drum 32.

Figure 3:
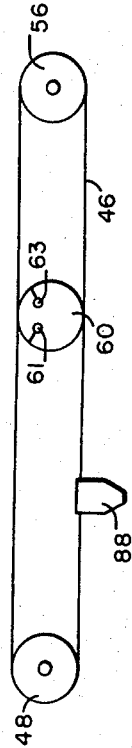
FIGURE 3 is a schematic view of the line driving mechanism for moving the stylus.

A stylus lift mechanism comprises a longitudinal rod 26 that is mounted on a pair of eccentric members 24 and 25 that are positioned in bearing recesses in the cylindrical bulkheads 82 and 84. Rods 26 have knurled operating members 22 on the ends thereof. Thus upon rotation of knurled members 22, the cam members or eccentric members 24 cause rods 26 to move radially outward relative to the drum 32 thereby raising the end 88 of the stylus member outwardly and out of contact with the paper 34. Each stylus member 88 and 89 is connected to a cable, line, string or like flexible member 46 that is rotated on pulleys 48, 56 and 60. Motor means 54 rotate the driving pulley 56 moving the cable 46. Pulley 60 responds to movement of the pulley 56 for turning a potentiometer 58. Idler pulley 48 carries the cable in its rotating movement and is rotatably mounted by mounting member 50 on the stylus trolley 98. As may be seen in FIGURE 3, one end of the cable 46 is connected to aperture 61 with approximately three loops of the cable 46 being lapped in a counter clockwise direction around pulley 60 and then looped around the driving pulley 56. The other end of the cable 63 is connected to pulley 60 and has approximately 3 lengths of cable wrapped in a clockwise direction around pulley 60 and is connected to the stylus 88 and is looped around the idler pulley 48. Thus it may be seen that any movement of the cable or line 46 will cause a corresponding rotating movement of the potentiometer driving pulley 60 and a corresponding movement of the stylus 88 or 89 that is secured to the line 46. It is possible for the driving pulley 56 to provide a slipping type clutch driving force where the stylus 88 is, for example, driven to the end of its movement in a right or left direction.

Identical motors 54 and potentiometers 58 drive each of the stylus 86 and 89 in the same manner with there being two separately operable stylus for recording information on the paper 34. A bracket support member 66 holds the motors and potentiometers in position within the drive mechanism cover with one end of the brackets 68 being secured to bulkhead 82 and the other end of the support member 66 being secured by screws 70 to the end 14 of the cover 12. It being recognized that a similar support structure 66 is also provided for supporting the motors 72 and 74, and motor 54 and potentiometer 58.

Motor 72 drives gear 76 that turns driving gear 80 for rotating the drum 32. Potentiometer 74 is turned by drive gear 78 that is turned by gear 80. Appropriate electrical sockets 64 are provided for receiving electrical connections that carry input signal information to be recorded.

Figure 4:
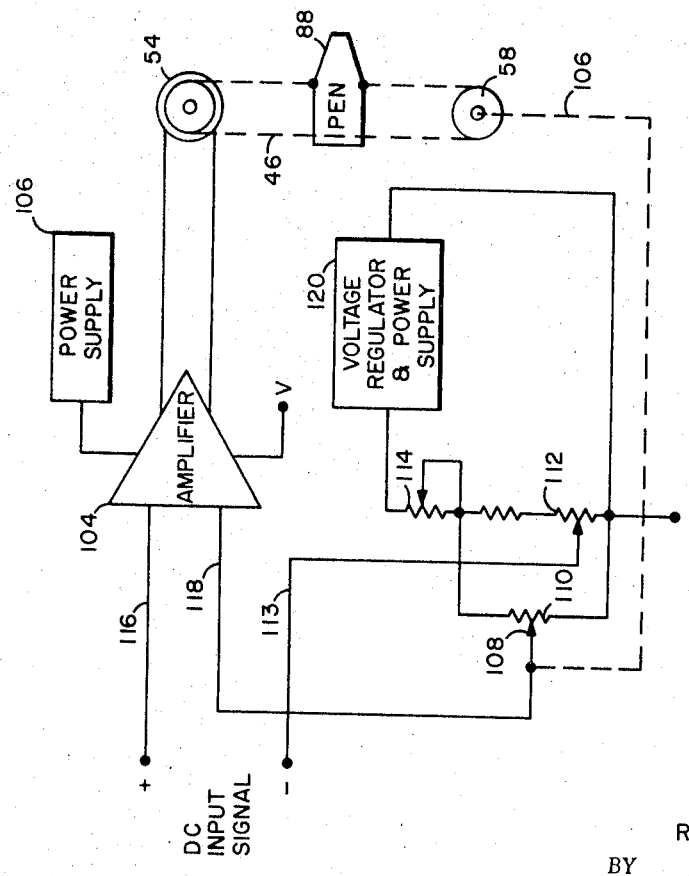
FIGURE 4 is a schematic diagram of the circuit of the stylus position control mechanism.

The control circuit for receiving the information to be recorded and that drives the respective motors for moving the syli and for turning the drum under control of the respective potentiometers is the same for each styli and for the drum and is illustrated in FIGURE 4. Referring now to FIGURE 4, the information to be recorded is, for example, a D.C. input signal having a magnitude of from, for example, zero to .5 volt. The level will vary depending upon the information received. The power to the unit is provided by a power supply 106 that supplies power to the amplifier 104. A voltage regulator power supply 120 supplies power across variable resistor 114 and zero adjust resistor 112 and provides power across the potentiometer 110. Pickoff 108 takes power off the potentiometer 110 and applies it through line 118 to the amplifier 104. The amplifier operates in a manner that will be described in more detail hereinafter. The input signal on line 113 is varied through a zero adjust resistor 112 that essentially places the lower side of the potentiometer 110 at the same potential as the potential on line 113.

In operation, the amplifier 104 has a differential circuit 167, an electrical dampening circuit 169 and a power amplifier circuit 171. The differential circuit 167 detects a differential between the potentials in line 116 and 118 and provides a power output proportional to that differential that drives motor 54. Motor 54 moves the stylus pin 88 through cable 46 to a given position with the pin marking as it moves. Potentiometer drive mechanism 58 responds to movement of the cable 46 and moves the pickoff member 108 on the potentiometer resistor 110. Pickoff member 108 is moved to a point where the potential in line 118 is equal to the potential in line 116. At this point the amplifier no longer detects a differential in the potentials between the input lines and the motor operation ceases. Accordingly the motor is operated to a point of zero potential along lines 116 and 118, which zero potential is detected and nulled by the potentiometer drive mechanism 58 and the potentiometer 110.

The amplifier 104, responds to input signals on lines 116 and 118 as follows, see FIGURE 5. Diodes 146, transistor 148, resistor 156 and resistor 142 function as a common mode rejection circuit. This circuit prevents the amplifier from limiting when both input signals change together. Transistors 140 and 152 detect any differential signal between the input signal and the follow-up signal. This differential signal is amplified and applied to the second stage transistors 154 and 162. The second stage transistors also function as a differential amplifier that accepts the difference signal from the first stage. The amplified voltage appears across resistors 158 and 160. If, as the input signal changes, it adds or subtracts base current to transistor 140, this base current change produces a collector current change. This collector current changes does two things. It creates a voltage change across resistor 144 and a voltage change across the common mode rejection circuit elements 148 and 156. The voltage drop across this common mode network causes the collector current change of transistor 152. This collector current change produces a voltage change across its collector resistor element 150. The result is, that as the collector current through transistor 140 increases, the collector current through transistor 152 decreases producing a larger differential voltage than was applied at the input because of the inherent gain of these transistors. These collector voltage changes are applied to the bases of transistors 154 and 162 which transistors serve the same purpose as transistors 140 and 152. That is, they produce a large output voltage change at their collectors for a small input voltage change to their bases. This large differential based output voltage is then applied to the bases of transistors 170 and 172 and is amplified.

As the base current to transistor 170 is increased, the collector current through this transistor is increased. This collector current develops a voltage across capacitor 176 and resistor 178. Since capacitor 176 has a long time constant, it does not charge immediately. Therefore the base voltage rises much more rapidly than the emitter voltage. This more rapid rise of base voltage causes a very rapid rise in collector current that produces a very rapid rising voltage across resistor 168. Eventually the emitter voltage, that is the voltage developed across 178, charges to its final value and the resultant amplification is proportional to the emitter resistor and the collector resistor, both resistances of which are equal. The resultant direct coupled gain is thus unit, however during the change of base voltage and the lag of the charging network 176 and 178, a very high gain occurs. The purpose of this very high gain is to retard motor changes, thus producing damping. Transistor 172, resistor 180, capacitor 182 and resistor 174 serve likewise except in the opposite direction. Thus as the base current is increasing into transistor 170, it is decreasing into transistor 172. As the voltage is rising very rapidly across resistor 168 it is dropping very rapidly across resistor 174. The output of this network is fed into transistor 184 and transistor 198. This differential output voltage serves to drive the power amplifier section.

The power amplifier draws very low quiescent current. With no differential input signal and a low common mode signal appearing across resistors 168 and 174, the power amplifier draws for example, approximately 1 milliamp at 6 volts D.C. If a negative going signal appears at transistor 184, a positive signal appears at the transistor 198. So the positive going signal at transistor 198 does very little. If transistor 198 is already cut off, this positive signal cuts it off even further. However, the negative going signal appearing at the base of transistor 184 applies a large amount of collector current to drive the bases of transistors 186 and 192. This increase in base current causes an increase of collector current through transistors 186 and 192. These collectors are connected to the motor. As this collector current increases the motor turns. As the input signal of the pre-amplifier is reduced to zero and then goes negative, the signal appearing at transistor 184 goes positive and the signal appearing at transistor 198 starts negative. This reversal in power amplifier input voltage causes the motor to turn in an opposite direction. When the input signal from the pre-amplifier is zero, then the motor is stopped and does not turn.

In operation, the drum 32 of the portable, three-function, graphic plotter is inserted through aperture 21 onto shaft 38 in a manner that aperture 40 passes over radial projection 42. Paper is passed out of a slit or the like 39 and is ready to receive the graphical information from the stiyli 88 and 89. Plate 16 is secured to the outer surface of the bulkhead 84 and the unit is ready for operation.

Connectors for applying signal information to the graphic plotter and recorder are connected through sockets 64 in the end 14 of housing 12. Each styli 88 and 89 and the shaft 38 are moved by motors and this movement is sensed by the potentiometer driving means that are essentially illustrated in FIGURES 4 and 5. Information in the form of D.C. input signals is applied to lines 113 and 116. Amplifier 104 responds to the input differential voltage across lines 113 and 116, as transmitted through the zero adjust 112, through potentiometer resistors 110 pickoff 108 and line 118. This differential voltage is detected by amplifier 104 and is amplified to energize motor 54 to move the stylus 88 by moving the cable 46. The motor 54 moves the cable 46 until the potentiometer driving mechanism 58 moves the pickoff 108 on potentiometer resistor 110 to a point that the voltages in lines 116 and 118 are equal. At this point amplifier 104, through its electrical dampening circuit 169, provides a current to decelerate and stop motor 54. The pin 88 continues to mark in a given line on a rotating drum 32. The mechanism for controlling the other stylus 89 is identical to that for controlling movement of the stylus 88.

The drum 32 is turned by motor 72 that drives a gear 76 that inturn rotates drive gear 80. This in turn rotates shaft 38 that rotates drum 32. Also connected to gear 80 is small drive gear 78 that turns potentiometer 74. This turning of potentiometer 74 functions in the same manner as cable 46 in the circuit illustrated in FIGURE 4 and thus moves the potentiometer pickoff 108 to a point of equilization of the input voltage in lines 116 and 118 that ceases operation of the motor 72. Thus the drum rotates in a direction determined by the positive or negative condition of the voltage received by the amplifier and rotates or stops depending upon whether a differential in voltage exists.

It may thus be seen that the input information applied to the three-function, portable, graphic plotter and recorder is derived from three sources that rotates the drum and drives the pair of styli 88 and 89.

When it is desired to remove the drum and the information recorded on the paper 34, the styli lifters 22 are rotated causing the eccentric 24 to rotate rods 26 radially outward lifting the styli arms 88 and moving the marking pins from contact with the paper 34. End plate 16 is removed in the manner previously described, and the drum is slipped off shaft 38 and the paper removed.

Having thus described my invention, I now claim:
1. A three-function portable graphic plotter and recorder for recording input signal information in graphic form comprising,
   a recording drum,
   a frame for holding said drum for rotational movement,
   a pair of movable stylus means for marking three-function signal information on said drum,
   a position sensing means for each of said stylus and for said drum for providing three separate feedback voltages each of which are proportional to the respective positions of each of said stylus and said drum,
   amplifier means for each of said stylus and said drum for comparing said input signal information with said feedback voltage for each of said stylus and said drum and providing output voltages proportional to the voltage differential of said input signal information and said feedback voltages,
   and a plurality of motor means responsive to said output voltages for moving each of said stylus and said drum.

2. A three-function portable graphic plotter and recorder for recording input signal information in graphic form as claimed in claim 1 in which,
   said frame comprises a pair of spaced apart circular bulkheads held together by longitudinal rods,
   one of said bulkheads having a circular opening for receiving said drum,
   a shaft for carrying said drum having an end projecting through the other of said bulkheads,
   each of said movable stylus means being mounted on one of said longitudinal rods for movement thereon,
   separate mechanical linkage means inner-connecting each of said stylus with one of said motor means positioning said stylus,
   a gear train for connecting the end of said shaft projecting through said bulkhead to one of said motor means,
   and each of said position sensing means for each of said stylus and said drum being mechanically connected to said mechanical linkage means.

3. A three-function portable graphic plotter and recorder for recording input signal information in graphic form as claimed in claim 1 in which,
   a compartment secured to one end of the other of said bulkheads for enclosing said motor means and said position sensing means,
   and said mechanical linkage means comprises a plurality of cables that pass through apertures in the other of said bulkheads.

References Cited

UNITED STATES PATENTS

| | | | |
|---|---|---|---|
| 3,024,078 | 3/1962 | Gorrell | 346—49 X |
| 3,321,766 | 5/1967 | Everest | 346—32 |
| 3,370,300 | 2/1968 | Gilovich et al. | 346—32 X |

RICHARD B. WILKINSON, *Primary Examiner.*

J. W. HARTARY, *Assistant Examiner.*

U.S. Cl. X.R.

346—49, 125